United States Patent
Moua et al.

(10) Patent No.: US 10,518,693 B2
(45) Date of Patent: Dec. 31, 2019

(54) PICKUP TRUCK CARGO-RESTRAINT SYSTEM

(71) Applicant: Ford Global Technologies, LLC, Dearborn, MI (US)

(72) Inventors: Jimmy Moua, Canton, MI (US); Gregory Hagedorn, Bloomfield Hills, MI (US); Johnathan Andrew Line, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 155 days.

(21) Appl. No.: 15/807,807

(22) Filed: Nov. 9, 2017

(65) Prior Publication Data
US 2019/0135163 A1    May 9, 2019

(51) Int. Cl.
*B60P 7/08*    (2006.01)

(52) U.S. Cl.
CPC ........... *B60P 7/0853* (2013.01); *B60P 7/0846* (2013.01)

(58) Field of Classification Search
CPC ....... B60P 7/083; B60P 7/0807; B60P 7/0853; B60P 7/0846
USPC .......... 410/100, 103, 106, 104, 105, 117, 47
See application file for complete search history.

(56) References Cited

U.S. PATENT DOCUMENTS

| | | | |
|---|---|---|---|
| 3,428,331 A * | 2/1969 | Morgan | B60P 7/083 410/100 |
| 4,367,993 A | 1/1983 | Meigs | |
| 5,338,136 A | 8/1994 | Hetchler | |
| 5,961,263 A | 10/1999 | Nunez | |
| 6,109,846 A * | 8/2000 | Davis | B60P 7/0846 410/100 |
| 6,939,095 B1 * | 9/2005 | Hugg | B60P 7/0807 410/100 |
| 7,789,603 B2 * | 9/2010 | Huck | B60P 7/083 410/100 |
| 7,909,553 B2 * | 3/2011 | Snyder | B60R 9/00 410/100 |
| 8,370,997 B2 * | 2/2013 | Wright | A44B 11/125 24/265 CD |
| 2003/0145434 A1 * | 8/2003 | Lin | B60P 7/0823 24/68 CD |
| 2004/0094650 A1 * | 5/2004 | Huang | B60P 7/0846 242/385.4 |
| 2012/0110801 A1 * | 5/2012 | Joubert | B60P 7/0846 24/68 CD |
| 2017/0113595 A1 | 4/2017 | Hemphill | |

* cited by examiner

*Primary Examiner* — D Glenn Dayoan
*Assistant Examiner* — Sunsurraye Westbrook
(74) *Attorney, Agent, or Firm* — Vichit Chea; Brooks Kushman, P.C.

(57) ABSTRACT

A cargo-restraint system includes a cargo-restraint apparatus and an anchor plate disposed on a sidewall of a pickup-truck box. The cargo-restraint apparatus includes a spool supported for rotation within a housing, and a strap wound on the spool and extendable and retractable relative to the housing. A strap-return mechanism rotationally biases the spool in a return direction of the strap. A ratchet assembly is supported by the housing and is configured to resist rotation of the spool in the return direction when engaged and to permit rotation when disengaged. The housing is configured to connect with the anchor plate to secure the cargo-restraint apparatus to the box.

19 Claims, 3 Drawing Sheets

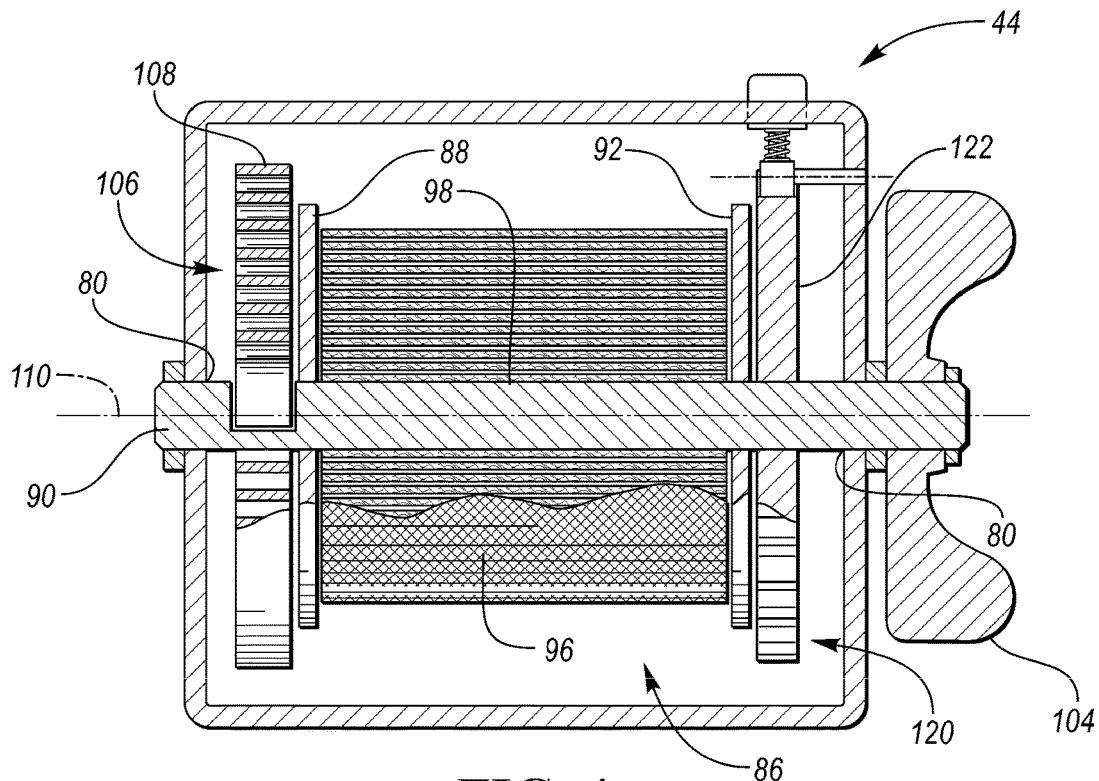
FIG. 4
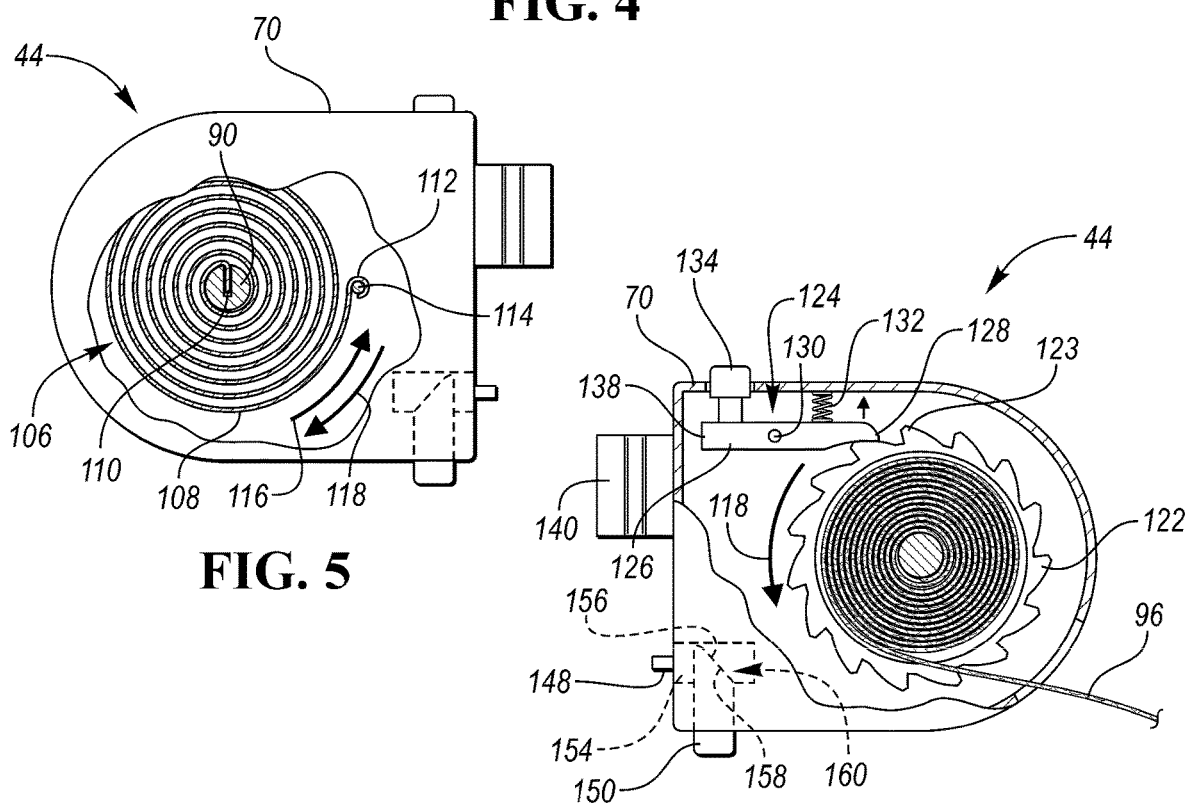
FIG. 5
FIG. 6

PICKUP TRUCK CARGO-RESTRAINT SYSTEM

TECHNICAL FIELD

This disclosure relates to the field of cargo-restraint systems for securing cargo in a box of pickup truck.

BACKGROUND

Pickup trucks are motor vehicles with a rear open-top cargo area that is often referred to as a cargo box. The cargo box has a bed, opposing sidewalls, a header, and a tailgate. The box is attached to and supported by the chassis. The opposing sidewalls include inner and outer panels connected together along the top rail and at other locations.

Cargo is often transported within the cargo box and rope or tie-downs are typically used to secure the cargo in place. The tie-downs may have a pair of straps having hooked ends attached to the opposing sidewalls and non-hooked ends connect with a cinching mechanism used to tighten the tie-down. The straps are typically long and tend to become entangled during storage. Also, after cinching, a substantial portion of at least one of the straps is unused and should be secured to prevent the extra portion from flapping in the wind which can damage the pickup truck or the cargo.

SUMMARY

According to an embodiment, a cargo-restraint apparatus includes a spool supported for rotation within a housing, and a strap wound on the spool and extendable and retractable relative to the housing. A strap-return mechanism rotationally biases the spool in a return direction of the strap. A ratchet assembly is supported by the housing and is configured to resist rotation of the spool in the return direction when engaged and to permit rotation when disengaged.

According to another embodiment, a cargo-restraint system of a pickup-truck box includes an anchor plate supported on one of the sidewalls of the box. The anchor plate defines an opening. A tie-down of the system includes a spool housing having a cleat adapted to be received within the opening to secure the housing to the anchor plate. A spool is supported for rotation within the housing. A strap of the tie-down has a fix end attached to the spool and a free end adaptable to attach to the box. The spool is rotatable in a first direction to release a portion of the strap and is rotatable in a second direction to retract the strap. The spool is biased in the second direction to retract the strap. A ratchet assembly is supported by the housing and is configured to resist rotation of the spool in the second direction when engaged to prevent automatic retraction of the strap and to permit rotation in the second direction when disengaged allowing the strap to be automatically retracted into the housing.

According to yet another embodiment, an automatically retractable spool-type tie-down for use with a pickup truck includes a housing attachable to a sidewall of a pickup-truck box. The tie-down further includes a spring-loaded spool supported for rotation within the housing and biased in a return direction, and a strap wound on the spool and extendable from the housing to secure cargo. A ratchet assembly is supported by the housing and is configured to resist rotation of the spool to maintain extension of the strap when engaged and to permit rotation in the return direction when disengaged to automatically recoil the strap.

BRIEF DESCRIPTION OF THE DRAWINGS

FIG. 4 is a cross-sectional view of the cargo-restraint apparatus along line 4-4.

FIG. 5 is a side view of the cargo-restraint apparatus cutaway to show a strap returned mechanism.

FIG. 6 is a side view of the cargo-restraint apparatus cutaway to show a ratcheting assembly and a strap.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
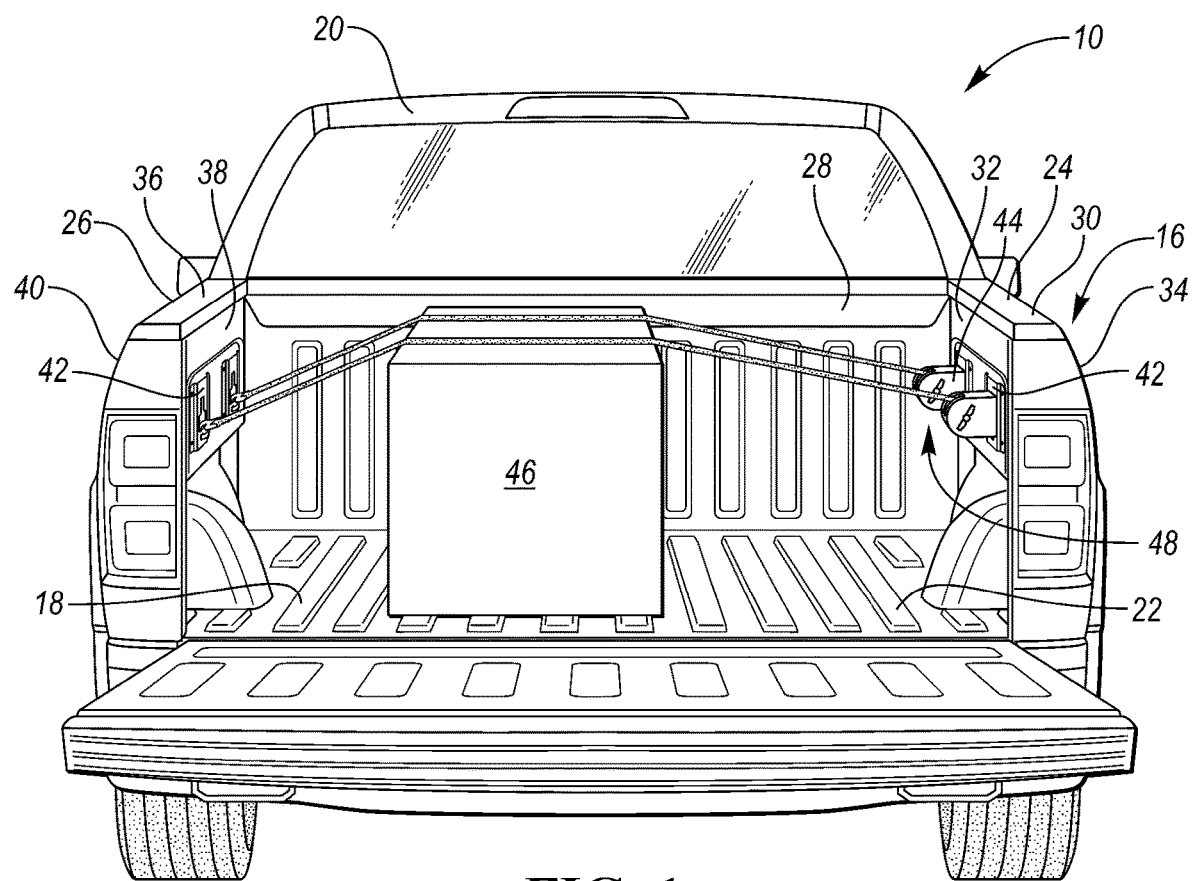
FIG. 1 is a rear view of a pickup truck with cargo secured in a box of the truck with a cargo-restraint system according to one or more embodiments of this disclosure.

FIG. 1 illustrates a rear portion of a pickup truck 10. The pickup truck 10 may include a frame having a first longitudinal frame rail and a second longitudinal frame rail. The pickup truck 10 has a cargo box 16 supported by the first and second frame rails. The box 16 includes a bed 18 having lateral support structures attached to the first frame rail and the second frame rail at a lower surface of the lateral support structures. The bed 18 has a floor surface 22 for supporting cargo.

The box 16 includes a first sidewall 24 attached along a first longitudinal side of the bed 18 and a second sidewall 26 attached along a second longitudinal side of the bed 18. The first sidewall includes a top surface 30 (also known as a top rail), an inner panel 32, and an outer panel 34. The second sidewall 26 includes a top surface 36 (also known as a top rail), an inner panel 38, and an outer panel 40. A header 28 is connected between the first and second sidewalls 24, 26 at a front portion of the box 16 near the cab 20. The box may be made of aluminum alloy, steel, or a composite material. The truck 10 includes a tailgate (not shown) pivotally attached to a rear end of the box 16 between the first sidewall 24 and the second sidewall 26.

The pickup truck 10 may be provided with an original equipment cargo-restraint system 48 that includes anchors 42 mounted on the sidewalls 24, 26 or the header 28 of the box 16 and one or more cargo-restraint apparatuses 44 that are connectable to the anchors 42. The cargo-restraint apparatuses 44 may also be referred to as tie-downs. In the illustrated embodiment, a cargo 46 is secured in the truck bed 18 by a pair of cargo-restrain apparatuses 44. Hooks of the cargo-restraint apparatuses 44 are attached to the anchors 42 on the left sidewall 26 and the housings of the cargo-restraint apparatuses 44 are attached to the anchors 42 on the right sidewall 24.

Figure 2:
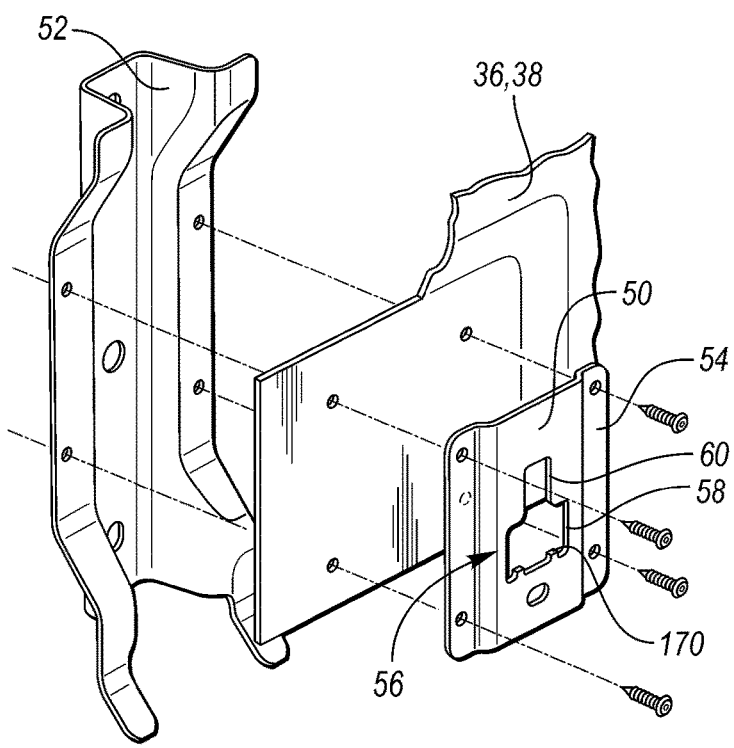
FIG. 2 is an exploded perspective view of an anchor plate connected to a sidewall of the box.

Referring to FIG. 2, each of the anchors 42 may include an anchor plate 50 that is mounted to a corresponding one of the sidewalls 24, 26. The anchor plate 50 may be located adjacent to a reinforcing structure 52 so that flanges 54 of the anchor plate 50 may be secured to the inner panel 36, 38 and the reinforcement structure 52 with one or more fasteners. The anchor plate 50 defines an opening 56 that is shaped and sized to connect with a cleat of the cargo-restraint apparatus 44. The opening 56 includes insertion portion 58 and a locking portion 60 that may be above the insertion portion 58. The insertion portion 58 is wider than the locking portion 60. The opening 56 and the cleat are designed so that the cleat can be inserted into and out of the insertion portion 58 but cannot be released from the locking portion 60 due to the locking portion 60 being narrower than a width of the cleat. This will be described in more detail below.

Figure 3:
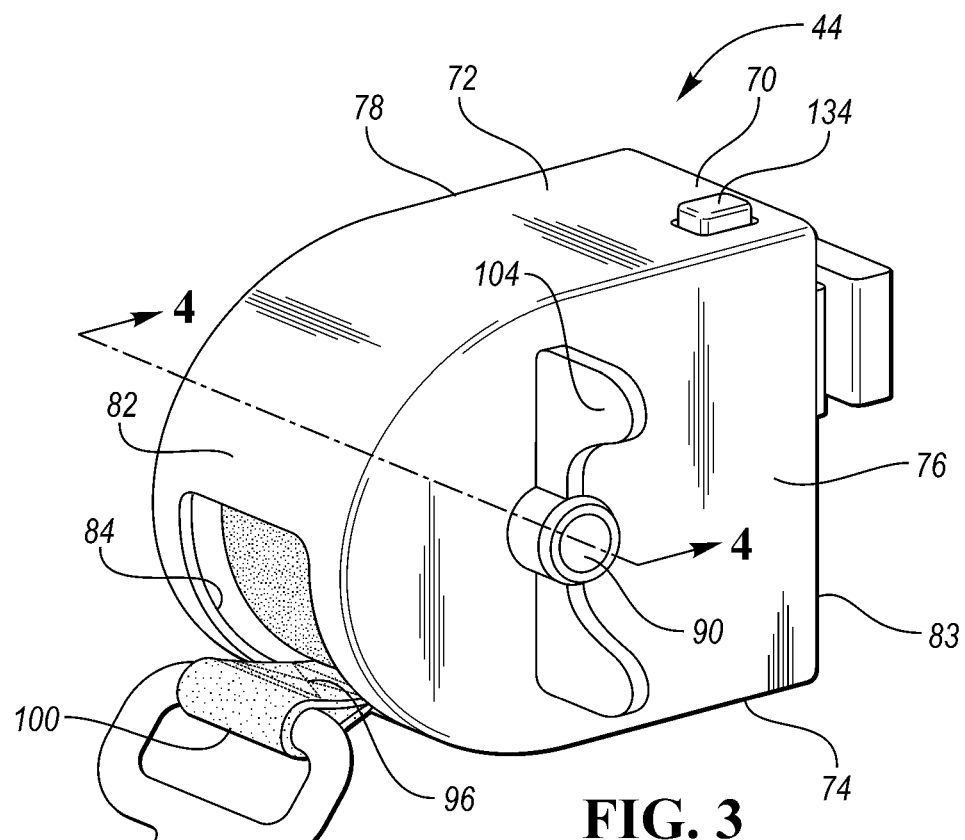
FIG. 3 is a front perspective view of a cargo-restraint apparatus.

Referring to FIGS. 3 and 4, an example cargo-restraint apparatus 44 includes a housing 70 having a top 72, a bottom 74, opposing sidewalls (76, 78), a front 82, and a back 83. A spool 88 is supported within an interior 86 of the housing 70. The housing 70 defines openings 80 in the sidewalls that support a shaft portion 90 of the spool 88. The spool 88 is supported for rotation within the housing. A strap 96 is coiled around a strap-carrier portion 92 of the spool 88. The strap 96 may be a flexible fabric or other suitable material. The strap 96 includes a fixed end 98 that is attached to the spool 88 and a free end 100 that may include a hook 102 allowing the free end 100 of the strap to be attached to other objects such as the anchor plate 42 or other potion of the pickup truck 10. The strap 96 is extendable into and out of the housing 70 via a slot 84 defined in the front 82. The strap 96 is dispensed from the housing 70 by pulling the free end 100 (or other portion of the strap) away from the housing 70 causing the spool 88 to rotate and dispense a desired length of strap 96 from the housing 70. A handle 104 is fixed to the spool 88 and allows a user to rotate the spool 88 to dispense or retract the strap 96.

Referring to FIGS. 4 and 5, the cargo-restraint apparatus 44 includes a strap-return mechanism 106 configured to automatically recoil the strap 96 on the spool 88. The strap-return mechanism 106 may include a spring 108 having a first end 110 fixed to the shaft portion 90 and a second end 112 fixed to the housing 70 by a pin 114. The spring 108 may be a spiral spring (also known as a clock spring). The spring 108 rotationally biases the spool 88 in a return direction 116. The spring 108 is compressed as the spool 88 is rotated in the dispensing direction 118, and if the spool 88 is released, the spring 108 expands causing the spool 88 to rotate in the return direction 116 to automatically recoil the strap 96.

Referring to FIGS. 4 and 6, the cargo-restraint apparatus 44 includes a ratcheting assembly 120 that resist rotation of the spool 88 relative to the housing 70 to lock the strap 96. The ratcheting assembly 120 may be configured to resist rotation in the return direction 116, the dispensing direction 118, or both. The ratcheting assembly 120 may include a gear 122 that is fixed to the shaft portion 90. The gear 122 includes a plurality of teeth 123 that are engageable with a pawl assembly 124. The pawl assembly 124 is configured to lock the gear 122 relative to the housing 70 to prevent rotation of the spool 88 in one or both directions 116, 118 when the pawl assembly 124 is fully engaged. The pawl assembly 124 may include an arm (pawl) 126 that is pivotally attached to the housing 70 by a pin 130. An engaging tip 128 is formed on a hooked end of the arm 126 and is configured to mesh with the teeth 123 on the gear 122. The arm 126 is pivotal between a first position in which the engaging tip 128 meshes with the teeth 123 and a second position in which the engaging tip 128 is disengaged from the teeth 123. In the illustrated embodiment, the teeth 123 of the gear 122 are curved to create a one-way ratcheting mechanism in which the spool 88 is inhibited from rotating in the dispensing direction 118 but is rotatable in the return direction 116. That is, the teeth 123 and the engaging tip 128 only mesh in the dispensing direction 118. The spool 88 may be set up to automatically retract or friction force between the arm 126 and the backside of the teeth 123 may be sufficient to prevent recoiling of the spool. This will be described in more detail below.

A spring 132 biases the arm to the first position. A user may pivot the arm 126 to the second position by depressing a release actuator 134 such as a button. When in the second position, the spool 88 is free to rotate in both directions 116, 118. The release actuator 134 extends through an opening in the top 72. In the illustrated embodiment, the spring 132 is a compression coil spring that is disposed between the tip 128 and the pin 130, and the release actuator 134 is located between a back end 138 of the arm 126 and the pin 130. Alternatively, the spring 132 may be a tension coil spring that connects between the end 138 and the housing 70. Since the teeth 123 only mesh in the dispensing direction 118, the spool would be permitted to freely rotate in the return direction 116 but for the friction force between the arm and the teeth. The friction force is based on the strength of the spring 132. The spring 108 urges the gear 123 in the return direction 116. If the spring 108 is strong enough to deflect the arm 126, i.e., overcome the friction force, the spool 88 will automatically recoil the strap 96, otherwise the spool 88 will be held by the friction force. Therefore, whether or not the spool 88 automatically retracts is based on the relative strengths of the springs 108 and 132.

In one embodiment, the relative strengths of the springs 108 and 132 results in the spool 88 not automatically retracting. Here, the ratcheting assembly 120 is configured to resist rotation of the spool 88 in both the return direction 116 and the dispensing direction 118, however, the teeth 123 and the arm 126 are configured to provide greater rotational resistance in the dispensing direction 118 (gear mesh) than in the return direction 116 (no gear mesh). This allows a large amount of tension to be placed on the strap 96 when securing cargo. Preventing rotation of the spool 88 in the return direction 116 requires less resistance as the pawl assembly 124 is only resisting the force of the strap-return mechanism 106, which is considerably less than the tension force applied to the strap 96 when securing cargo. The strap 96 can be retracted by manually turning the handle 104 to overcome the spring 132 or by pressing the release 134 allowing the spring 108 to automatically retract the strap 96.

Figure 7:
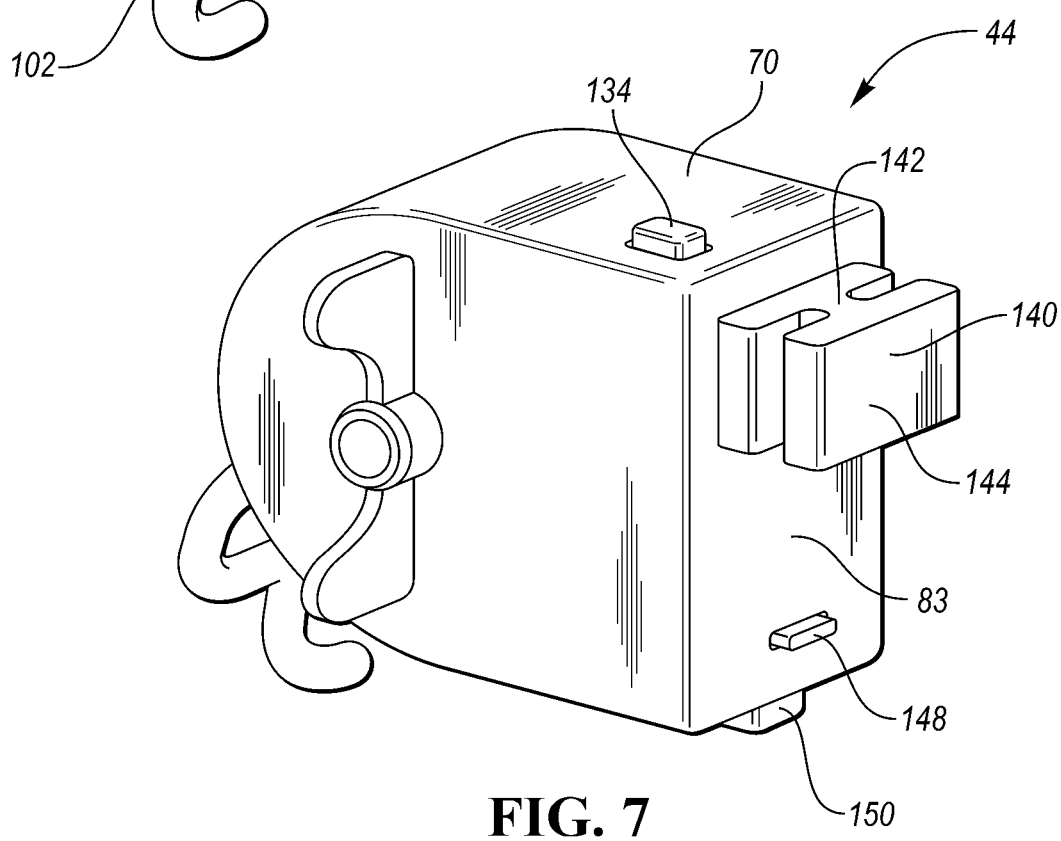
FIG. 7 is a back perspective view of the cargo-restraint apparatus.

Referring to FIG. 7, the housing 70 may include features that are specifically designed to connect with the anchor plate 50. The housing 70 may include a cleat 140 extending from a back 83 of the housing 70. The cleat 140 includes a neck 142 extending from the back 83 and a head 144 connected to a distal end of the neck 142. The neck 142 and the head 144 may be arranged to form a substantially T-shaped cross-section when viewed from above the housing 70. The cleat 140 and the opening 56 of the anchor plate 50 are designed so that the cleat 140 can be received within the insertion portion 58 and the neck 142 is receivable within the locking portion 60. The head 144 is wider than the locking portion 60 preventing the cleat 140 from being removed from the anchor plate 50 when the cleat 140 is disposed within the locking portion 60.

The housing 70 may be installed into the anchor plate 50 by inserting the cleat 140 into the insertion portion 58, and subsequently sliding the housing 70 upward to place the cleat 140 within the locking portion 60. The housing 70 includes a locking tab 148 that extends from the back 83 to engage with a bottom periphery 170 of the insertion portion 58 to prevent the cleat 140 from sliding out of the locking portion 60.

Referring back to FIG. 6, the locking tab 148 is biased to an extended position so that the housing 70 locks to the anchor plate 50 when installed. A button 150 is used to retract the locking tab 148 so that the housing 70 can be removed from the anchor plate 50. The button 150 is associated with an actuation mechanism that retracts the locking tab 148 when the button 150 is pressed. The actuation mechanism may include a first component 154 that is in line with the locking tab 148 and retracts the locking tab 148 when the button 150 is pressed. The first component 154 defines a ramped surface 156 that engages with a ramped surface 158 of the button 150 along an inclined plane 160. When the button 150 is pressed, the ramped surfaces 156, 158 cooperate to retract the locking tab 148 into the housing 70 so that the housing 70 can be removed from the anchor plate 50.

The pickup truck 10 may have an associated cargo-restraint system including anchor plates 50 specifically designed to function with one or more cargo-restraint apparatuses 44. Using the cargo-restraint system 48, one or more pieces of cargo 46 can be secured to the bed 18. The following provides an example procedure for using the illustrated embodiment of the system 48.

To secure the cargo 46, a user may insert the cleat 140 of a cargo-restraint apparatus 44 into the insertion portion 58 of one of the anchor plates 50. The user then slides the cleat 140 upwards and into the locking portion 60 until the locking tab 148 is seated. The housing 70 is now secured to the sidewall. Next, the user dispenses the strap 96 from the housing 70 by simultaneously depressing the release actuator 134 and pulling a desired length of strap 96. The user then arranges the strap 96 on the cargo 46 as desired and attaches the hook 102 onto another of the anchor plates 50 or to some other type of anchor provided on the vehicle or on the cargo itself (The ratcheting assembly 120 will prevent recoiling of the strap while the user arranges the strap and secures the hook.) Once the hook 102 is securely anchored, the user may press the release actuator 134 allowing the spring 108 to automatically recoil the strap 96. At this point, the strap 96 will have a small amount of tension. The user may then rotate the handle 104 to tension the strap 96 as desired. The ratcheting assembly 120 will maintain the user-desired tension.

The user may release tension on the strap 96 by depressing the release actuator 134 to disengage the ratcheting assembly 120. The user may then detach the hook 102 and separate the strap 96 from the cargo 46. Once the strap 96 is free, the user may depress the release actuator 134 allowing the strap-return mechanism 106 to automatically recoil the strap 96 on the spool 88 for storage. The housing 70 can be removed from the truck 10 by pressing the button 150 to disengage the locking tab 148 so that the cleat 140 may be slid downward and removed from the insertion portion 58 of the anchor plate 50.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A cargo-restraint apparatus comprising:
   a housing defining an opening;
   a shaft extending through the housing and rotatable relative to the housing;
   a spool supported on the shaft within the housing, the spool being rotationally fixed to the shaft and rotatable within the housing via the shaft;
   a strap extendable through the opening and including a fix end attached to the spool and a free end adapted to attach to an object, the strap being wound on the spool such that the spool rotates in a first direction when the strap is extended and rotates in a second direction when the strap is retracted;
   a strap-return mechanism including a biasing member having a first portion fixed to the housing and a second portion fixed to the shaft, wherein the biasing member urges the shaft in the second direction to retract the strap onto the spool;
   a ratchet assembly disposed in the housing and including a gear fixed to the shaft and a pawl fixed to the housing, the pawl being biased to engage with the gear, wherein the gear and the pawl are configured to mesh when the gear is rotated in the first direction to resist rotation of the shaft and inhibit extension of the strap and configured to not mesh when the gear is rotated in the second direction to permit rotation of the shaft in the second direction; and
   a release actuator connected to the pawl and configured to disengage the pawl from the gear when actuated, wherein the strap-return mechanism automatically retracts the strap when the release actuator is actuated.

2. The cargo-restraint apparatus of claim 1, wherein the biasing member is a spring.

3. The cargo-restraint apparatus of claim 2, wherein the spring is a spiral spring.

4. The cargo-restraint apparatus of claim 1, wherein the housing includes a cleat adapted to be received within a mounting plate.

5. The cargo-restraint apparatus of claim 1, wherein the pawl is biased such that friction force between the pawl and the gear resists rotation of the shaft in the second direction.

6. The cargo-restraint apparatus of claim 1, wherein the gear defines teeth that are curved in the first direction.

7. The cargo-restraint apparatus of claim 6, wherein the pawl is pivotally mounted to the housing and has a tip configured to mesh with the teeth of the gear, wherein the arm pawl is pivotal between a first position in which the tip is meshed with the teeth and a second position in which the tip is not meshed with the teeth.

8. The cargo-restraint apparatus of claim 7, wherein the ratchet assembly further includes a spring acting between the housing and the pawl to bias the pawl into the first position.

9. The cargo-restraint apparatus of claim 7, wherein the ratchet assembly further includes a pin extending through the pawl and mounted to the housing, and, wherein the release actuator is configured to rotate the pawl about the pin, wherein the pin extends through the pawl between the tip and the release actuator.

10. The cargo-restraint apparatus of claim 1 further comprising a handle fixed to a portion of the spool that is external to the housing.

11. A cargo-restraint system of a pickup-truck box including opposing sidewalls, the cargo-restraint system comprising:
 an anchor plate supported on one of the sidewalls of the box and defining an opening; and
 a tie-down including:
  a spool housing having a cleat adapted to be received within the opening to secure the housing to the anchor plate,
  a shaft extending through the housing and rotatable relative to the housing,
  a spool supported on the shaft within the housing, the spool being rotationally fixed to the shaft and rotatable within the housing via the shaft,
  a strap including a fix end attached to the spool and a free end adapted to attach to the box, wherein the spool is rotatable in a first direction to release a portion of the strap and is rotatable in a second direction to retract the strap,
  a strap-return mechanism including a biasing member having a first portion fixed to the housing and a second portion fixed to the shaft, wherein the biasing member urges the shaft in the second direction to retract the strap onto the spool,
  a ratchet assembly disposed in the housing and including a gear fixed to the shaft and a pawl fixed to the housing, the pawl being biased to engage with the gear, wherein the gear and the pawl are configured to mesh when the gear is rotated in the first direction to resist rotation of the shaft and inhibit extension of the strap and configured to not mesh when the gear is rotated in the second direction to permit rotation of the shaft in the second direction, and
  a release actuator connected to the pawl and configured to disengage the pawl from the gear when actuated, wherein the strap-return mechanism automatically retracts the strap when the release actuator is actuated.

12. The cargo-restraint system of claim 11 further comprising a second anchor plate disposed in the other of the sidewalls, wherein the free end is connectable to the second anchor plate to secure the strap over cargo disposed between the anchor plate and the second anchor plate.

13. The cargo-restraint system of claim 11, wherein the cleat includes a head and a neck, and wherein the opening defines an insertion portion sized to receive the head therethrough and a locking portion that is sized to receive the neck, wherein the locking portion is narrower than head to prevent removal of the cleat.

14. The cargo-restraint system of claim 13 further comprising a locking tab extending from a same side of the housing as the cleat and configured to engage with an edge portion of the opening to retain the cleat in the locking portion of the opening.

15. The cargo-restraint system of claim 11, wherein the pawl is biased such that friction force between the pawl and the gear resist rotation of the shaft in the second direction.

16. The cargo-restraint system of claim 11, wherein the biasing member is a spring.

17. The cargo-restraint system of claim 16, wherein the pawl is pivotally mounted to the housing and has a tip configured to mesh with teeth of the gear, wherein the pawl is pivotal between a first position in which the tip is meshed with the teeth and a second position in which the tip is not meshed with the teeth.

18. An automatically retractable spool-type tie-down for use with a pickup truck, the tie-down comprising:
 a housing attachable to a sidewall of a pickup-truck box;
 a spring-loaded spool supported for rotation within the housing and biased in a return direction;
 a strap wound on the spool and extendable from the housing to secure cargo;
 a ratchet assembly supported by the housing and configured to resist rotation of the spool to maintain extension of the strap when engaged and to permit rotation in the return direction when disengaged to automatically recoil the strap; and
 a spiral spring having a first end fixed to the housing and a second end fixed to the spool, wherein the spring biases the spool in the return direction.

19. The tie-down of claim 18, wherein the ratchet assembly includes a gear fixed on the spool and a pawl assembly engageable to lock the gear to the housing.

* * * * *